(12) United States Patent
Bryan

(10) Patent No.: US 10,021,957 B1
(45) Date of Patent: Jul. 17, 2018

(54) LAPTOP SUPPORT

(71) Applicant: Alex Bryan, Port Towsend, WA (US)

(72) Inventor: Alex Bryan, Port Towsend, WA (US)

(*) Notice: Subject to any disclaimer, the term of this patent is extended or adjusted under 35 U.S.C. 154(b) by 0 days.

(21) Appl. No.: 15/676,854

(22) Filed: Aug. 14, 2017

(51) Int. Cl.
A47B 97/04 (2006.01)
A45F 5/00 (2006.01)
F16M 13/04 (2006.01)

(52) U.S. Cl.
CPC .............. *A45F 5/00* (2013.01); *F16M 13/04* (2013.01); *A45F 2200/0525* (2013.01)

(58) Field of Classification Search
USPC ........................................................ 248/444
See application file for complete search history.

(56) References Cited

U.S. PATENT DOCUMENTS

| | | | | | |
|---|---|---|---|---|---|
| 1,816,262 | A * | 7/1931 | Ritter | ................... | A47D 15/006 128/875 |
| 4,264,049 | A * | 4/1981 | Daniels | .................. | F16M 13/04 248/444 |
| 4,765,583 | A * | 8/1988 | Tenner | .................. | A47B 23/002 108/43 |
| 4,903,932 | A * | 2/1990 | Stewart, Jr. | ................ | A45F 5/00 224/267 |
| 5,001,791 | A * | 3/1991 | Toso | ........................ | A47C 4/52 297/464 |
| 5,263,423 | A * | 11/1993 | Anderson | .................. | A45F 5/00 108/43 |
| 5,607,091 | A * | 3/1997 | Musacchia | .......... | A01M 31/004 108/43 |
| 5,643,184 | A * | 7/1997 | Toso | ....................... | A47C 16/00 2/44 |
| 5,779,211 | A * | 7/1998 | Bird | ....................... | G06F 3/0395 224/222 |
| 5,927,210 | A * | 7/1999 | Hacker | ................. | A47B 23/002 108/43 |
| 6,083,183 | A * | 7/2000 | Yang | ....................... | A61F 5/028 128/876 |
| 6,123,309 | A * | 9/2000 | Sage | ..................... | F16M 11/041 248/316.1 |
| 6,202,236 | B1 * | 3/2001 | Price | ....................... | A47C 16/00 297/464 |
| 6,663,072 | B1 * | 12/2003 | Ritchey | ..................... | A45C 3/02 248/346.03 |
| 6,883,694 | B2 * | 4/2005 | Abelow | ................... | G06F 1/163 224/666 |
| 9,375,073 | B2 * | 6/2016 | Orr, Jr. | ........................ | A45F 5/00 |
| 9,538,852 | B2 * | 1/2017 | Levy | | |
| 2007/0221696 | A1 * | 9/2007 | Kakita | ................... | A45C 15/00 224/581 |
| 2009/0229497 | A1 * | 9/2009 | Persico | ................ | A47B 23/002 108/43 |
| 2012/0246879 | A1 * | 10/2012 | Pestal | .................. | A47B 23/002 24/3.2 |
| 2012/0325995 | A1 * | 12/2012 | Balestrino | .............. | F16M 13/04 248/274.1 |

* cited by examiner

*Primary Examiner* — Monica E Millner
(74) *Attorney, Agent, or Firm* — Purol Patents; Sarah Purol

(57) ABSTRACT

An apparatus for supporting a laptop or tablet computer when being used by someone in a reclining position with their knees bent up. It suspends the computer by a main strap that is wrapped around the knees, and two support straps that hang from the front of the main strap. The laptop is held in a secure position on a user's thighs by resting front corners of the laptop within the two support straps. The laptop support is also usable in a second position with the laptop resting between a user's thighs.

4 Claims, 4 Drawing Sheets

LAPTOP SUPPORT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of personal computer supports and more specifically relates to a portable support for a laptop or notebook tablet.

2. Description of the Related Art

Laptop and notebook tablet computers have become increasingly more popular because of their light weight and portability. Users of laptop and notebook tablets appreciate the ability to carry these devices and use them in a variety of settings. Often a user may wish to use their laptop or notebook tablet while sitting in a reclining position with the knees bent up. With the user in this seated reclining position, there is a need for a device which will provide secure support for the portable computer upon the thighs or between the knees of the user. It is also necessary for the user to be comfortable and not straining to hold the laptop or notebook in the desired orientation.

Most laptop and tablet computer supporting devices to date are intended for use while as the user is standing in an upright position. Still other laptop and tablet computer supporting devices may be employed while the user is in a seated position but fail to provide stable secure support for the laptop if the user needs to shift position to become more comfortable in a reclining position.

Ideally, a laptop or tablet computer support should provide stable secure support and, yet would operate reliably and be manufactured at a modest expense. Thus, a need exists for a reliable laptop or tablet computer support to avoid the above-mentioned problems.

BRIEF SUMMARY OF THE INVENTION

In view of the foregoing disadvantages inherent in the known laptop and notebook support art, the present invention provides a novel laptop support. The general purpose of the present invention, which will be described subsequently in greater detail is to provide a stable secure support for a laptop or notebook computer when being used by someone in a reclining position with their knees bent up. The laptop support may be used in either one of two positions.

In a first position, the laptop or notebook is supported upon the thighs of the user and can be adjusted either higher on the thighs (closer to the knees) or lower on the thighs (closer to the gut). The laptop support lets the laptop or notebook hang from the knees or upper shins, keeping the weight and lower edges of the same off the gut or hips. A main strap and a knee strap also holds the knees together instead of having to hold them together with the muscles of the inner thighs. This allows for a relaxing rest for those muscles and contributes to the comfort of using the laptop support.

In a second position, the laptop or notebook is supported between the knees and rests on the main strap and a center strap. The main strap can be loosened at a buckle on the right side, and the legs can be allowed to comfortably drop further apart so the laptop or notebook can settle in between the knees, resting more on the center strap, as well as being pinched and supported by the inner knees/thighs of the user.

The present invention holds significant improvements and serves as a laptop support. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, the laptop support is constructed and operative according to the teachings of the present invention.

The various embodiments of the present invention will hereinafter be described in conjunction with the appended drawings, wherein like designations denote like elements.

DETAILED DESCRIPTION

Figure 1:
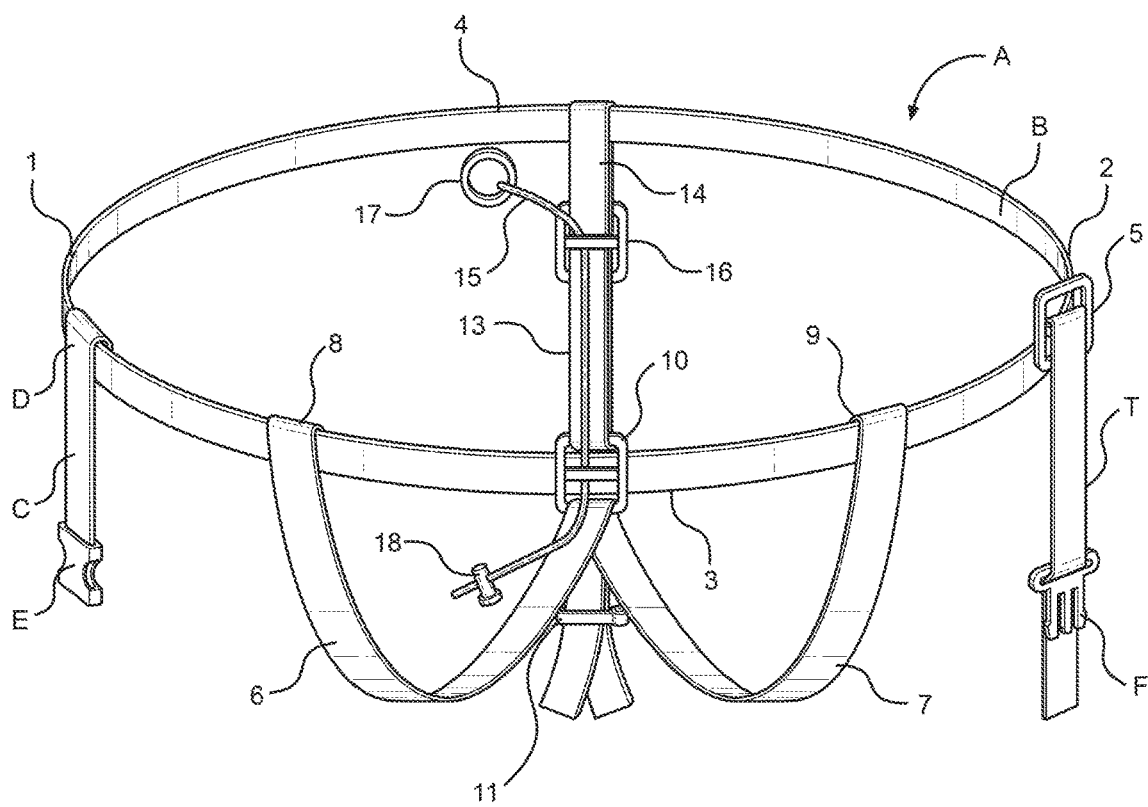
FIG. 1 shows a perspective view illustrating a perspective view of the laptop support not in use according to an embodiment of the present invention.
Figure 2:
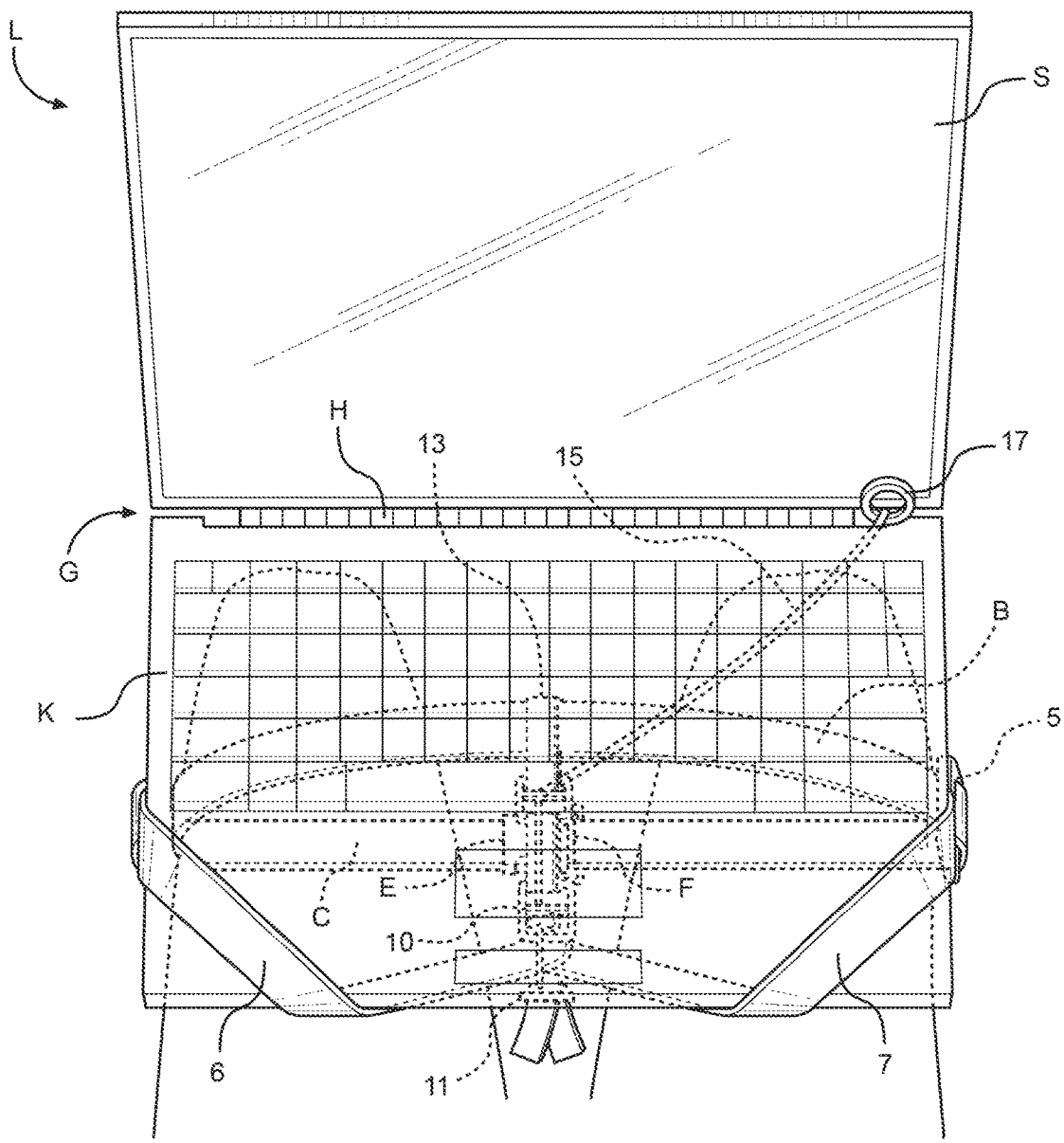
FIG. 2 is a front view illustrating a laptop support in use in a first position according to an embodiment of the present invention of FIG. 1.
Figure 3:
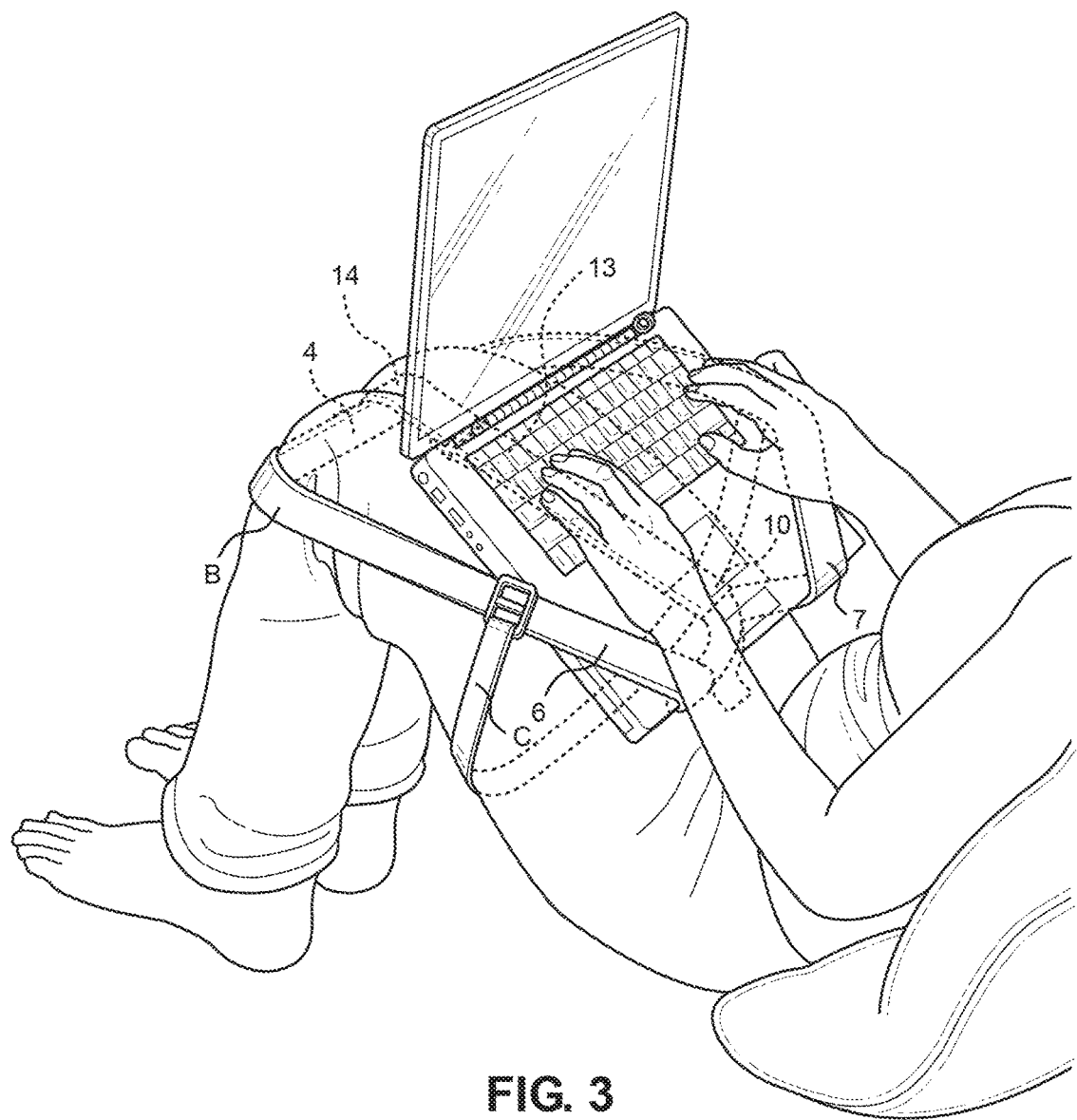
FIG. 3 is a side view illustrating a laptop support in use in a first position according to an embodiment of the present invention of FIG. 1.
Figure 4:
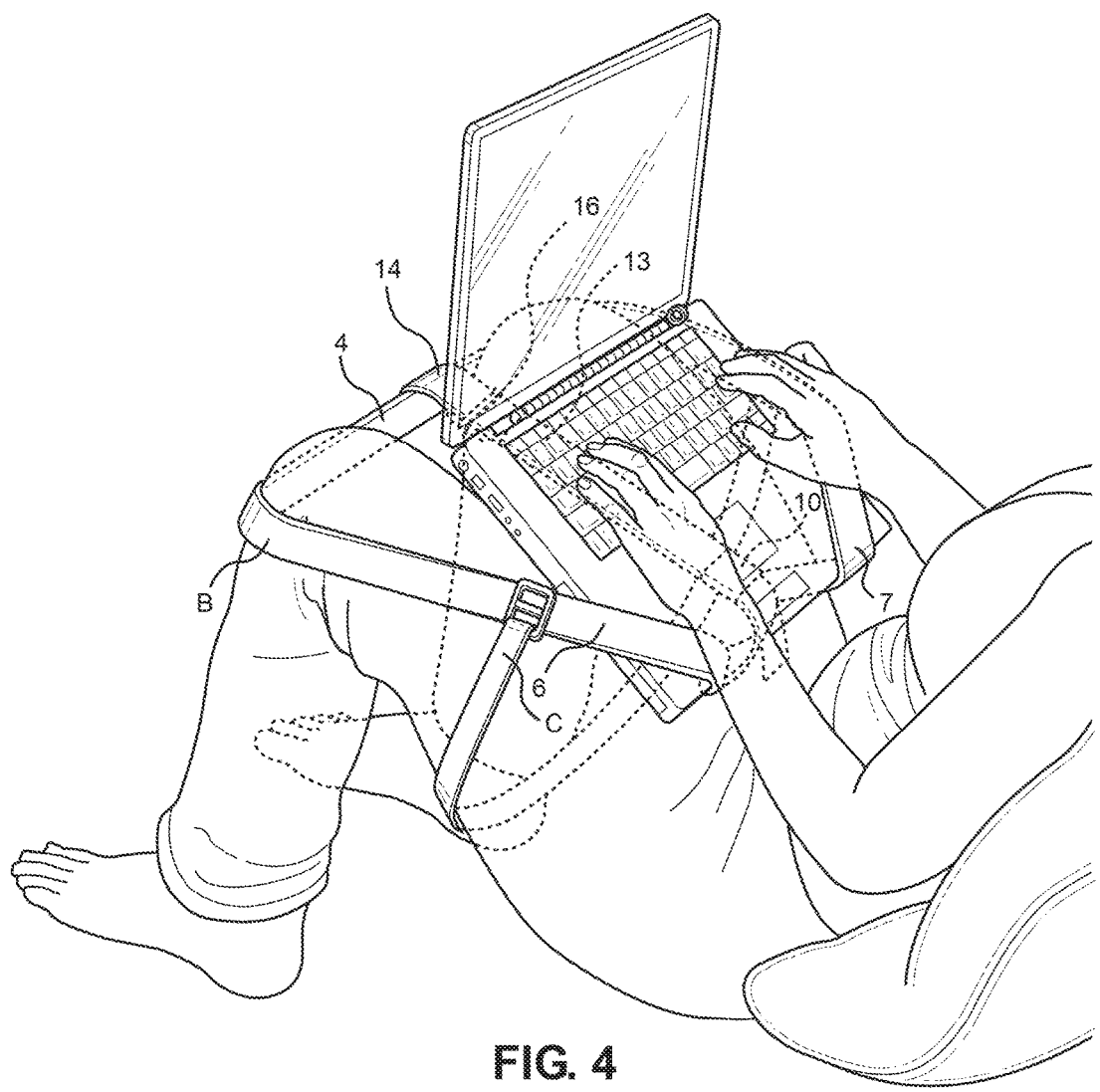
FIG. 4 is a side view illustrating a laptop support in use in a second position according to an embodiment of the present invention of FIG. 1.

FIG. 1 is an illustration of the laptop support not in use but as it would appear to a user in preparation for use. FIG. 2 is a front view with a laptop L in a first use position with the laptop rendered as mostly transparent, with the user's knees behind it in dotted lines, and the parts of the laptop support that are behind it shown in dotted lines. FIG. 3 is a side view with the main strap running alongside of the left knee of a user and with the support straps running over the corners of a laptop L. FIG. 4 is a front view of the laptop support A in a second position with the laptop L positioned between the knees of a user.

The laptop support A as shown in FIG. 1-4 consists of a main strap B that wraps around the knees of a user and is adjustable by a plastic cam buckle 5. The main strap B as shown in FIG. 1 has left 1, right 2, front 3 and back 4 sides. Left 6 and right 7 support straps hang down from the front 3 of the main strap B and are adjustable to accommodate different sized computers or laptops and to lower or raise the same upon the thighs of the user as will be described further herein. There is also an adjustable knee strap C that passes below the knees of the user and is removably attached to the left 1 and right 2 side of the main strap B.

An adjustable center strap 13 goes from the front 3 of the main strap B to the back 4, and is attached to the back 4 of the main strap B by a loop 14 that can slide as the length of the main strap B is adjusted and still allow the center strap 13 to remain between the knees of the user. At the front 3 of the main strap B, the center strap 13 attaches to the main strap B and to the left 6 and right 7 support straps as will be described further herein. A retainer string 15 is attached at one end to the loop 14 at the back of the center strap 13 where it connects to the main strap B by a buckle 16 and is also threaded through to the front 3 of the main strap B where it is further connected as will be described herein. One end of the retainer string 15 slides into the gap G formed by the hinge H connecting a laptop keyboard K to its screen S and is held in place by a ring 17. The ring 17 passes between the screen S and the keyboard K of a laptop L at the gap G in the hinge H area to stabilize the laptop L at the hinge H area as the laptop L rests upon the knees of the user in the first use position as seen in FIG. 2. The retainer string 15 is also adjustable and serves to tighten the laptop L upon the knees of a user to prevent the computer from falling forwards on the user due to the weight of the screen S and the angle to which it is placed for the user. The retainer string 15 is not necessary when the laptop support A is used with a tablet as the screen is integral with the keyboard. All the straps are adjustable to accommodate different sized users and computers and to allow the user to secure the computer to the user's body to the best advantage.

As stated above, the laptop support A includes a main strap B which has a left side 1 which in use is located by the left knee of the user. The right side 2 which in use is located by the right knee of the user, the front 3 which in use faces the user, the back 4 which in use rests across the shins of the user are also shown in FIGS. 2-4. A plastic cam buckle 5 is provided for adjusting the length of the main strap B and which is located at the right side 2 of the main strap B. The main strap B has a tail end T which comes out of the cam buckle 5 and has the male end F of a side release buckle threaded onto it. A knee strap C hangs from the left side of the main strap B at left loop D with the female end E of a side release buckle at the free end thereof and is best seen in FIG. 1.

A left support strap 6 and right support strap 7 hang down from the front 3 of the main strap B and are attached by left loops 8 and right loop 9 respectively and slide on the main strap B to accommodate the width of a tablet or computer. The left support strap 6 and right support strap 7 come together in the center of the front 3 of the main strap B and thread through a square buckle 10 where the length can be adjusted. An adjustable stop 11 prevents the right 7 and left 6 support straps from sliding out of the buckle 10 when they are adjusted to a maximum length allowed by the length of the straps. Likewise, the adjustable stop 11 along with the square buckle 10, helps secure the right 7 and left 6 support straps at the desired length for the user's convenience as the laptop L rests at the desired position upon a user's thighs in the first position as shown in FIG. 2 and FIG. 3 or between a user's thighs in the second positon shown in FIG. 4.

A center strap 13 goes from the front 3 of the main strap B to the back 4, and is attached to the back 4 of the main strap B by a back loop 14 so that it can slide as the length of the main strap B is adjusted. At the front 3 of the main strap B, the center strap 13 attaches to the square buckle 10. The center strap 13 itself is adjustable at buckle 16.

The straps and buckles may be of any suitable material such as plastic, nylon or propylene and the straps may be printed with colorful designs, logos, advertisements, sport team or school emblems.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An adjustable support for a laptop wherein said support is configured to be supported upon the knees of a user while said user is in a seated reclined position with said knees of said user bent up, said adjustable support comprising:
    an adjustable main strap connected at opposite ends thereof;
        said adjustable main strap configured to encircle the knees of said user,
    an adjustable center strap;
        said center strap configured to extend between the knees of said user, said center strap connected to said main strap at opposite ends thereof,
    adjustable left and right support straps;
        said left and right support straps connected to said main strap and configured to receive lower corners of said laptop in a first use position wherein said laptop rests upon the thighs of said user;
    an adjustable retainer string having a ring disposed at an end thereof;
        said retainer string is adjustably attached to said center strap and said main strap, said retainer string is configured to pass between a screen and a base of said laptop at a hinge area such that said ring stabilizes said laptop at said hinge area as said laptop rests upon the thighs of said user in said first use position;
    an adjustable knee strap;
        said adjustable knee strap is configured to pass below both knees of said user and is connected at a free end thereof by a female end of a buckle and to a male end of a buckle at a tail end of said main strap for the purpose of helping to hold said knees of said user at a desired distance for said user, and further for the purpose of providing a supporting surface for said laptop when said support is in a second use position wherein said laptop is supported between said user's knees.

2. A method of using the adjustable support of claim 1 wherein a user:
- positions themselves in a seated reclining position with their knees up;
- positions said main strap around their shins and the front of their thighs;
- adjusts said main strap length for comfort;
- positions said center strap between their knees;
- adjusts said center strap for comfort;
- positions said knee strap below their knees and connects said female end and said male end of said buckle;
- adjusts said knee strap for comfort;
- positions a laptop left lower edge in said left support strap;
- positions said laptop right lower edge in said right support strap;
- adjusts said left support strap and said right support strap to comfortably allow said laptop to rest upon said user's thighs; and
- passing said retainer string between a screen and a base of said laptop at a hinge area such that said ring stabilizes said laptop.

3. An adjustable support for a laptop or tablet wherein said support is configured to be supported upon the knees of a user while said user is in a seated reclined position with said knees of said user bent up, said adjustable support comprising:
- an adjustable main strap connected at opposite ends so as to define a left side, a right side, a front side, and a back side; said right side having a first cam buckle for adjusting a length of said main strap; said main strap having a tail end coming out of said first cam buckle, said tail end having disposed thereon a male end of a side release buckle; said front side having disposed thereon a square buckle;
- an adjustable center strap configured to extend between the knees of said user and having a first end and an opposed second end, said first end having a back loop slidably attached to said back side of said main strap, said opposed second end being attached to said square buckle;
- an adjustable right support strap having a first end and an opposed second end, said first end having a right loop slidably attached to said front side of said main strap, said opposed second end being threaded through said square buckle;
- an adjustable left support strap having a first end and an opposed second end, said first end having a left loop slidably attached to said front side of said main strap, said opposed second end being threaded through said square buckle;
- an adjustable stop for securing said adjustable left support strap and said adjustable right support strap at a desired position;
- wherein said adjustable right support strap and said adjustable left support strap are configured to receive lower corners of said laptop or tablet in a first use position wherein said laptop or tablet rests upon the thighs of said user; and
- a knee strap configured to pass below both knees of said user and having at a first end thereof a loop and at an opposed second end a female end of a side release buckle, said loop connecting said knee strap to said left side of said main strap, said female end of said side release buckle configured to releasably fasten to said male end of said side release buckle providing for said knee strap to hold said knees of said user at a desired distance and for providing a supporting surface for said laptop or tablet when said support is in a second use position wherein said laptop or tablet is supported between said user's knees.

4. The adjustable support of claim 3, further comprising an adjustable retainer string having a ring disposed at an end thereof; said retainer string is adjustably attached to said center strap and said main strap, said retainer string is configured to pass between a screen and a base of said laptop at a hinge area such that said ring stabilizes said laptop at said hinge area as said laptop rests upon the thighs of said user in said first use position.

* * * * *